(12) United States Patent
Abdelshahid et al.

(10) Patent No.: US 12,494,892 B2
(45) Date of Patent: Dec. 9, 2025

(54) SANCTUARY ANTENNA FOR FREQUENCY DIVISION DUPLEX CARRIER DEGRADATION DURING TIME DIVISION DUPLEXING SOUNDING REFERENCE SIGNAL ANTENNA SHARING

(71) Applicant: T-MOBILE INNOVATIONS LLC, Overland Park, KS (US)

(72) Inventors: Wafik Abdelshahid, Kenmore, WA (US); William Martin Shvodian, McLean, VA (US); George Frantz Cummings, III, Gilbert, AZ (US); Christopher Thomas Bailey, Overland Park, KS (US); Ming Shan Kwok, Seattle, WA (US); Wei-Ming Lan, Morrisville, NC (US); Thomas Power Lucht, Seattle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 314 days.

(21) Appl. No.: 18/210,556

(22) Filed: Jun. 15, 2023

(65) Prior Publication Data

US 2024/0421969 A1 Dec. 19, 2024

(51) Int. Cl.
*H04L 5/14* (2006.01)
*H04L 5/00* (2006.01)

(52) U.S. Cl.
CPC .......... *H04L 5/1469* (2013.01); *H04L 5/0051* (2013.01)

(58) Field of Classification Search
CPC ............................ H04L 5/1469; H04L 5/0051
See application file for complete search history.

(56) References Cited

U.S. PATENT DOCUMENTS

2019/0052328 A1* 2/2019 Akula .................... H04L 5/006

* cited by examiner

*Primary Examiner* — Michael Thier
*Assistant Examiner* — Nevena Zecevic Sandhu
(74) *Attorney, Agent, or Firm* — Shook, Hardy & Bacon L.L.P.

(57) ABSTRACT

Methods, systems, and a non-transitory computer-readable medium that provide a sanctuary antenna for mitigating FDD carrier degradation during TDD antenna sharing are provided. The method begins with determining that the carrier degradation will occur during at least one FDD receive signal slot in a FDD frequency band on at least one antenna of the TDD frequency band based on the at least one FDD receive signal slot coinciding with at least one scheduled TDD transmit slot. Then, based on the determining, switching at least one scheduled FDD receive signal slot from the at least one antenna of the TDD frequency band to a sanctuary antenna occurs. The sanctuary antenna is used for a duration of at least one sounding reference signal (SRS) symbol.

20 Claims, 7 Drawing Sheets

SANCTUARY ANTENNA FOR FREQUENCY DIVISION DUPLEX CARRIER DEGRADATION DURING TIME DIVISION DUPLEXING SOUNDING REFERENCE SIGNAL ANTENNA SHARING

BACKGROUND

Sounding reference signal (SRS) is a carrier-based switching technique that enables SRS transmitted on non-SRS carriers to provide base station reciprocity assisted channel information. SRS may provide improved precoding for beamforming, however, it also poses challenges. During SRS antenna sharing on time division duplex (TDD) bands, if frequency division duplexing (FDD) is occurring concurrently with New Radio (NR) carrier aggregation, which uses the TDD band, and both antennas are sharing the same user equipment (UE) antenna branch, the FDD band suffers significant degradation. This degradation appears in the block error rate (BLER), which may reach as high as 90% during SRS symbol transmission. This high BLER may result in overall FDD throughput degradation of 30-35%, which in turn may result in a poor user experience.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods, systems, and a non-transitory computer-readable medium that provide a sanctuary antenna for mitigating FDD carrier degradation during TDD antenna sharing are discussed. The method begins with determining that the FDD carrier degradation will occur during at least one FDD receive signal slot in a FDD frequency band on at least one antenna of the TDD frequency band based on the at least one FDD receive signal slot coinciding with at least one scheduled TDD transmit slot. Then, based on the determining, switching at least one scheduled FDD receive signal slot from the at least one antenna of the TDD frequency band to a sanctuary antenna occurs. The sanctuary antenna is used for a duration of at least one sounding reference signal (SRS) symbol.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
AS Antenna Sharing
CA Carrier Aggregation
CD-ROM Compact Disk Read Only Memory
CDMA Code Division Multiple Access
eNodeB Evolved Node B
FDD Frequency Division Duplexing
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Receive Power
RSRQ Reference Signal Receive Quality
RSSI Received Signal Strength Indicator
SINR Signal-to-Interference-Plus-Noise Ratio
SNR Signal-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, $32^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., access point, node, cell sites, cell towers) to provide network coverage. The access points are employed to broadcast and transmit transmissions to user devices of the telecommunications network. An access point may be considered to be a portion of an access point that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, an access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency that is exclusive to that particular uplink connection (e.g., an LTE connection with an EnodeB). The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to device 1000 described herein with respect to FIG. 10.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR), reference signal received quality (RSRQ), and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

A first aspect of the present disclosure provides an apparatus for mitigating FDD carrier degradation during TDD SRS antenna sharing. The method begins with determining that the FDD carrier degradation will occur during at least one FDD receive signal slot in a FDD frequency band on at last one antenna of the TDD frequency band based on the at least one FDD receive signal slot coinciding with at least one scheduled TDD transmit signal slot. Next, based on the determining, switching the at least one schedule FDD receive signal slot from the at last one antenna of the TDD frequency band to a sanctuary antenna for a duration of at least one SRS symbol.

A second aspect of the present disclosure provides a method for mitigating FDD carrier degradation during TDD SRS antenna sharing. The method begins with receiving at least one uplink message from a UE at an access point. The uplink message contains slot assignments for at least one FDD receive frequency band and at least one TDD frequency band. The slot assignments for the at least one slot of the at least one FDD receive frequency band and the at least one TDD transmission band coinciding for at least a portion of a slot comprising a SRS symbol. Next, based on the at least one uplink message, directing the UE to switch from receiving the SRS symbol on at least one antenna of the at least one TDD transmission band to receiving the SRS symbol on a sanctuary antenna.

Another aspect of the present disclosure is directed to a non-transitory computer storage media storing computer-usable instructions that cause the processors to determine that carrier degradation will occur during at least one FDD receive signal slot in a FDD frequency band on at least one antenna of the TDD frequency band because the at least one FDD receive signal slot coinciding with at least one scheduled TDD transmit slot. Then, based on the determination, the processors will instruct a switch of the at least one scheduled FDD receive signal slot from the at least one antenna of the TDD frequency band to a sanctuary antenna for a duration of at least one SRS reference symbol.

Figure 1:
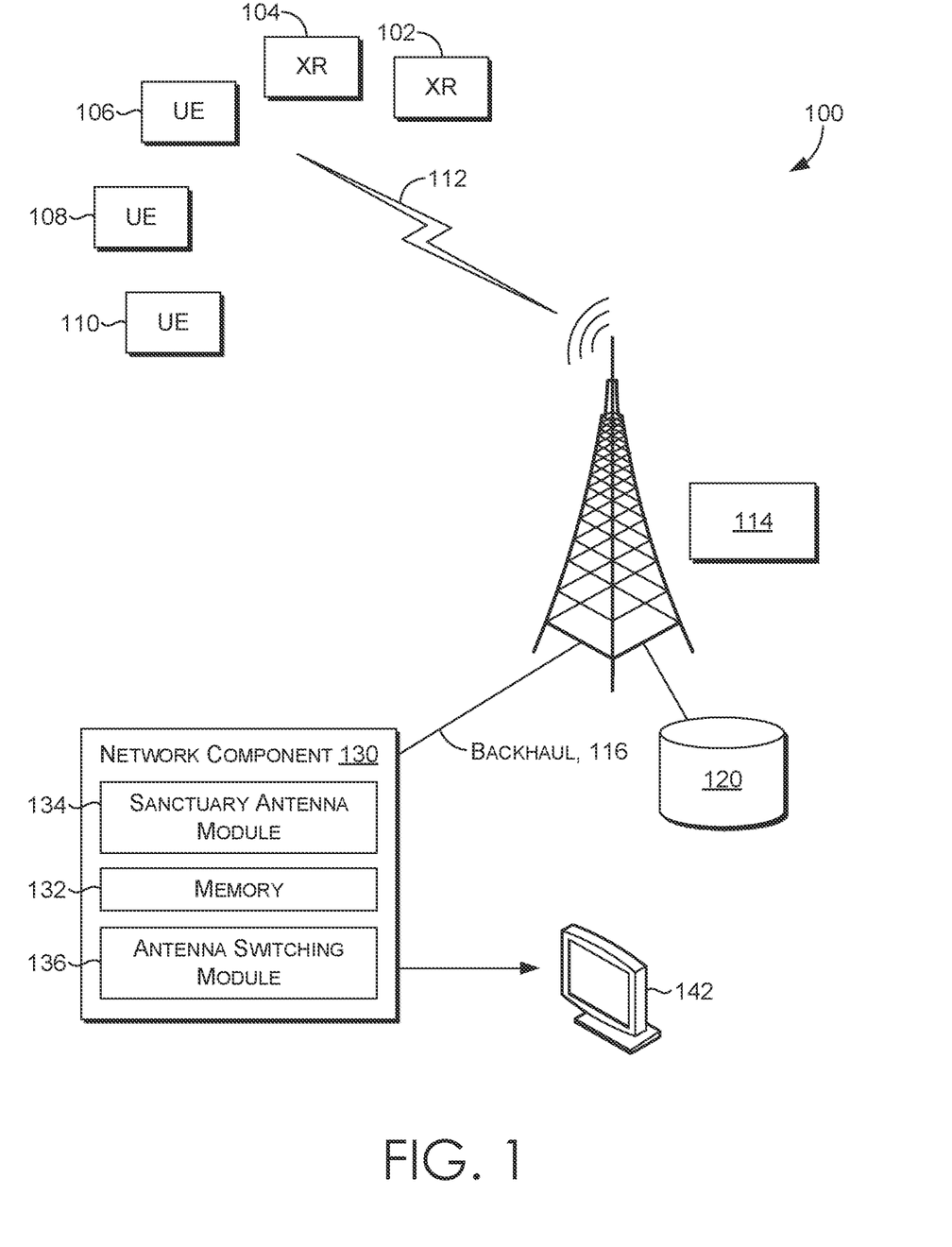
FIG. 1 depicts a diagram of an exemplary network environment in which implementations of the present disclosure may be employed, in accordance with aspects herein.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices (UE) 102, 104, 106, 108, and 110, access point 114 (which may be a cell site, access point, or the like), and one or more communication channels 112. The communication channels 112 and 146 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 1000) that communicates via wireless communications with the access point 114 in order to interact with a public or private network.

Figure 10:
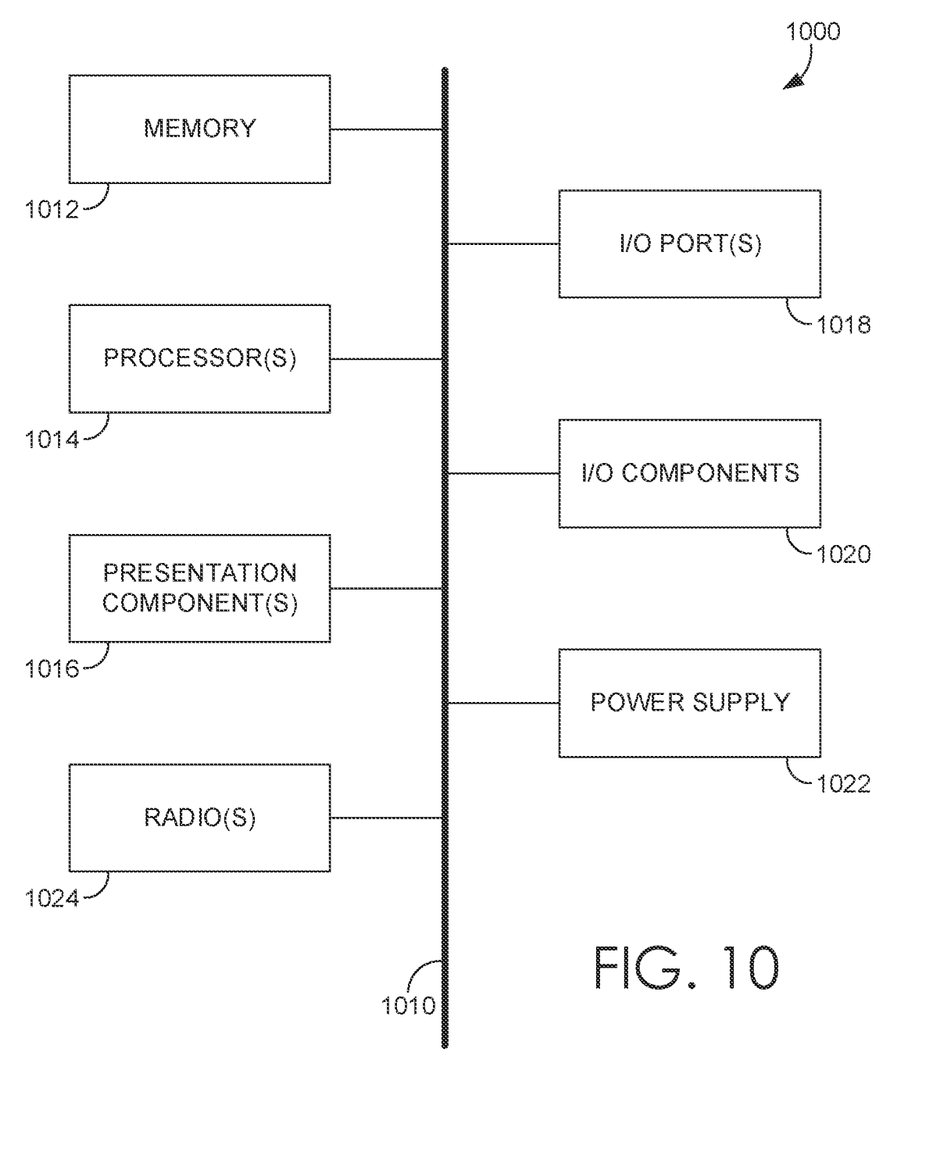
FIG. 10 depicts an exemplary computing device suitable for use in implementations of the present disclosure, in accordance with aspects herein.

In some aspects, each of the UEs 102, 104, 106, 108, and 110 may correspond to computing device 1000 in FIG. 10. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UEs 102, 104, 106, 108, and 110 in network environment 100 can optionally utilize one or more communication channels 112 or 146 to communicate with other computing devices (e.g., a mobile device(s), a server(s), a personal computer(s), etc.) through access point 114 or COW 144.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, access point 114 is configured to communicate with a UE, such as UEs 102, 104, 106, 108, and 110, that are located within the geographic area, or cell, covered by radio antennas of access point 114. Access point 114 may include one or more access points, base transmitter stations, radios, antennas, antenna arrays, power amplifiers, transmitters/receivers, digital signal processors, control electronics, GPS equipment, and the like.

As shown, access point 114 is in communication with a network component 130 and at least a network database 120 via a backhaul channel 116. As the UEs 102, 104, 106, 108, and 110 collect individual signal information, the signal information can be automatically communicated by each of the UEs 102, 104, 106, 108, and 110 to the access point 114. Access point 114 may store the signal information and data communicated by the UEs 102, 104, 106, 108, and 110 at a network database 120. Alternatively, the access point 114 may automatically retrieve the status data from the UEs 102, 104, 106, 108, and 110, and similarly store the data in the network database 120. The signal information and data may be communicated or retrieved and stored periodically within a predetermined time interval which may be in seconds, minutes, hours, days, months, years, and the like.

With the incoming of new data, the network database 120 may be refreshed with the new data every time, or within a predetermined time threshold so as to keep the status data stored in the network database 120 current. For example, the data may be received at or retrieved by the access point 114 or every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, a sanctuary antenna module 134, and an antenna switching module 136. All determinations, calculations, and data further generated by the sanctuary antenna module 134 and antenna switching module 136 may be stored at the memory 132 and also at the data store 140. Although the network component 130 is shown as a single component comprising the memory 132, sanctuary antenna module 134, and antenna switching module 136, GUI 138, it is also contemplated that each of the memory 132, the sanctuary antenna module 134, and the antenna switching module 136, may reside at different locations, be its own separate entity, and the like, within the home network carrier system.

The network component 130 is configured to retrieve signal quality metrics and carrier loading metrics from the access point 114 or one of the UEs, 102, 104, 106, 108, and 110. Signal quality metrics can include any one or more of multiple metrics, such as signal-to-interference and noise (SINR), reference signal received power (RSRP), and reference signal received quality (RSRQ). The network component 130 can also track uplink and downlink user traffic. The sanctuary antenna module 134 and antenna switching module 136 can observe data usage on at least one common channel over the network using measurement metrics such as SINR, RSRP, and RSRQ. The sanctuary antenna module 134 and antenna switching module may each be located in a central office or other centralized location. For a distributed radio access network, the sanctuary antenna module 134 and antenna switching module 136 can be located at the access point 114.

Figure 2:
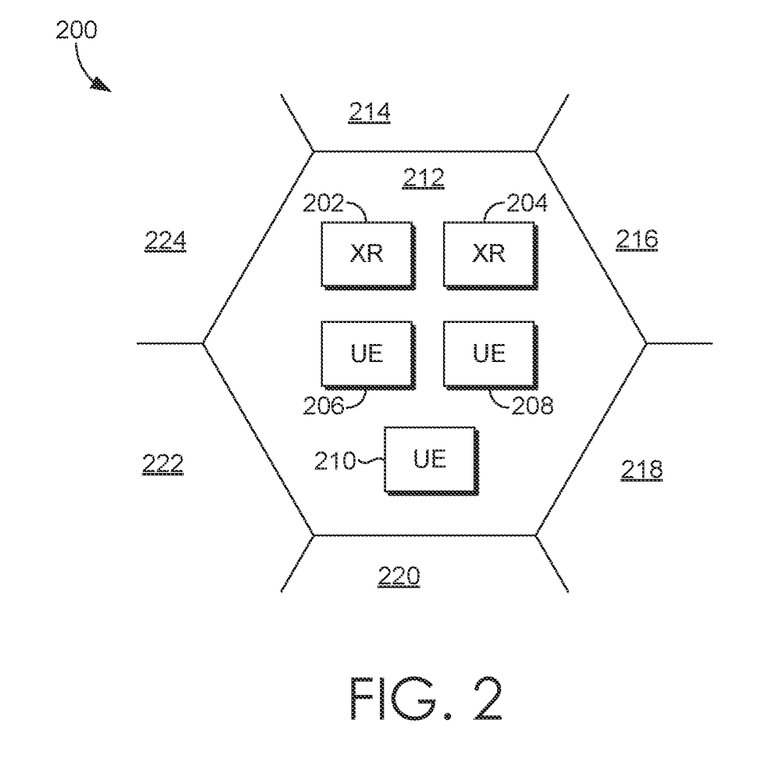
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, 224, each including access point 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210 may be located within geographic area 200 collecting UE data that is useable by network component 130, in accordance with aspects herein. UEs 202, 204, 206, 208, and 210 can move within the cell currently occupied, such as cell site 212 and can move to other cells such as adjoining cell sites 214, 216, 218, 220, 222 and 224.

Figure 3:
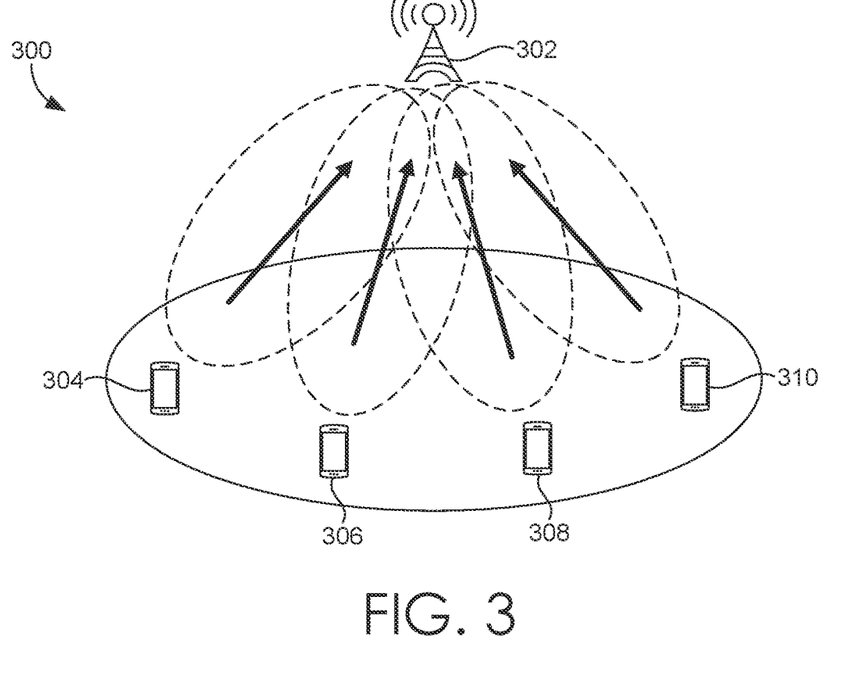
FIG. 3 depicts uplink SRS used in an exemplary network environment in which implementations of the present disclosure may be employed, in accordance with aspects herein.

FIG. 3 depicts uplink SRS used in an exemplary network environment in which implementations of the present disclosure may be employed, in accordance with aspects herein. SRS antenna switching is a beamforming method that relies on uplink/downlink reciprocity which is used for channel estimation. In this scenario, system 300 includes an access point 302 that can acquire knowledge about the downlink channels used for communication with UEs 304, 306, 308, and 310. The access point 302 acquires the relevant downlink channel characteristics for each of the UEs from uplink measurements from each UE. Each of UEs 304, 306, 308, and 310 sends an uplink signal to the access point 302, illustrated as an oblong. The uplink SRS from each receive antenna on each UE is used to obtain the channel information from the UE.

Figure 4:
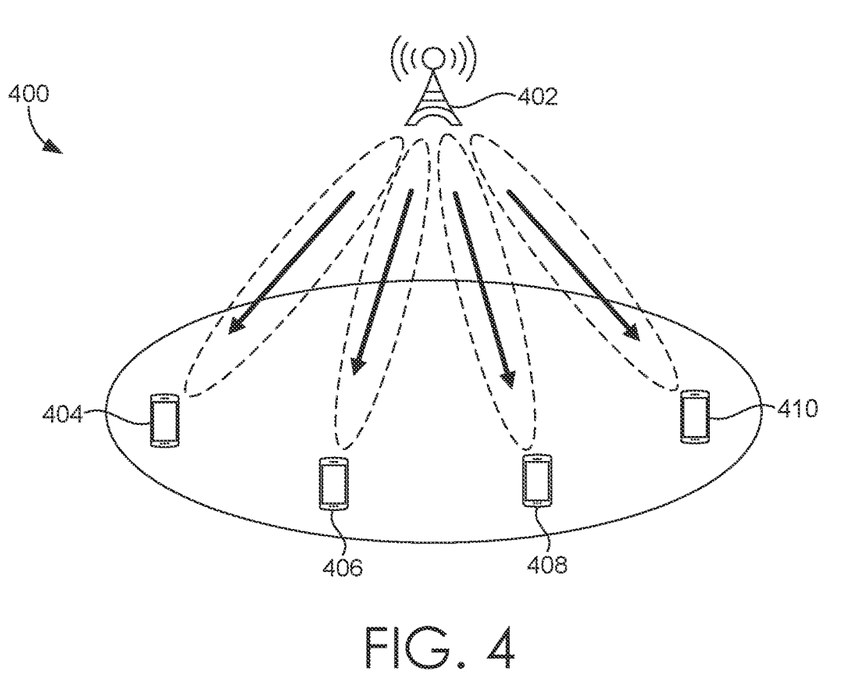
FIG. 4 depicts downlink SRS propagation in an exemplary network environment in which implementations of the present disclosure may be employed, in accordance with aspects herein.

FIG. 4 depicts downlink SRS propagation in an exemplary network environment in which implementations of the present disclosure may be employed, in accordance with aspects herein. In the scenario illustrated in FIG. 4, system 400 includes an access point 402 that has acquired relevant downlink channel characteristics from each of UEs 404, 406, 408, and 410 from uplink measurements. Downlink propagation may be estimated by the access point 402 using the uplink SRS sent by each of UEs 404, 406, 408, and 410 using each of a UE's receive antennas. UEs 404, 406, 408, and 410 may have at least one transmit antenna and may have up to four receive antennas. The access point 402 may then form beams for each downlink signal to each of UEs 404, 406, 408, and 410 and these downlink beams are narrower than the uplink beams, due to the beamforming using the SRS. This beamforming reduces interference and may also increase system capacity. These downlink beams may be narrower than the beams used with some codebook-based multiple input multiple output (MIMO) systems. UEs 404, 406, 408, and 410 may have one of multiple antenna configurations including one transmit antennas and two receive antennas, one transmit antennas and four receive antennas, two transmit antennas and four receive antennas, and two transmit antennas and eight receive antennas. For each UE, an antenna transmit switch port controls the transmit and receive antennas.

Figure 5:
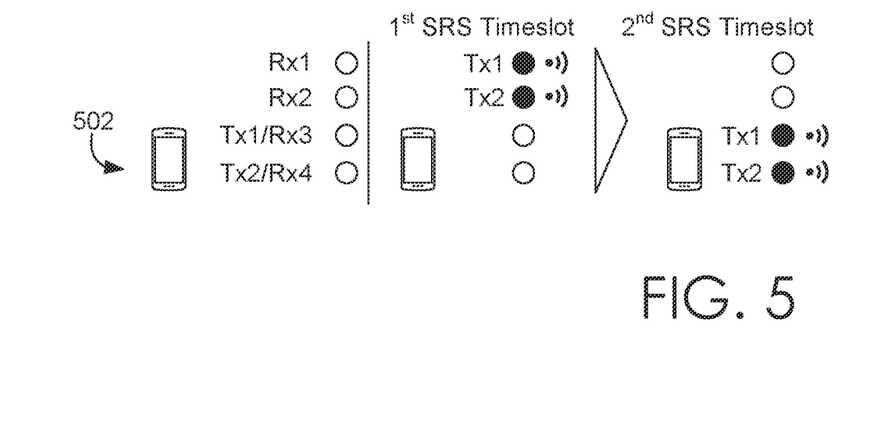
FIG. 5 illustrates timeslot allocation for a UE with two transmit and four receive antennas, in accordance with aspects herein.

FIG. 5 illustrates timeslot allocation for a UE with two transmit and four receive antennas, in accordance with aspects herein. A UE 502 has two transmit antennas and four receive antennas and has uplink MIMO capability. The first receive antenna is denoted Rx1, the second receive antenna is denoted Rx2, the third antenna may be used for both transmitting and receiving and is denoted Tx1/Rx3, and the fourth antenna may also be used for both transmitting and receiving and is denoted Tx2/Rx4. In a first SRS timeslot both Tx1 and Tx2 transmit to an access point, such as access point 302 in FIG. 3. In a second SRS timeslot Tx1 and Tx2 transmit to the access point.

Figure 6:
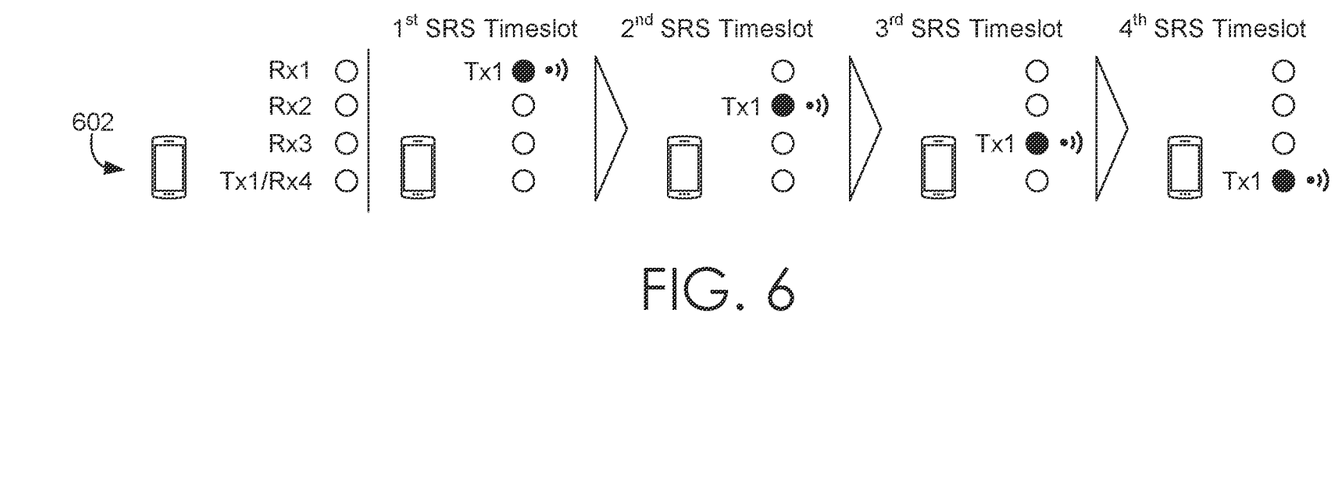
FIG. 6 illustrates timeslot allocation for a UE with one transmit and four receive antennas, in accordance with aspects herein.

FIG. 6 illustrates timeslot allocation for a UE with one transmit and four receive antennas, in accordance with aspects herein. A UE 602 has one transmit antenna and four receive antennas. The first receive antenna is denoted Rx1, the second receive antenna is denoted Rx2, the third receive antenna is denoted Rx3, and the fourth antenna may be used for both transmitting and receiving and is denoted Tx1/Rx4. In a first SRS timeslot antenna Tx1 transmits to an access point, while in a second SRS timeslot antenna Tx1 transmits, in a third SRS timeslot antenna Tx1 transmits, and transmits again in a fourth SRS timeslot.

Figure 7:
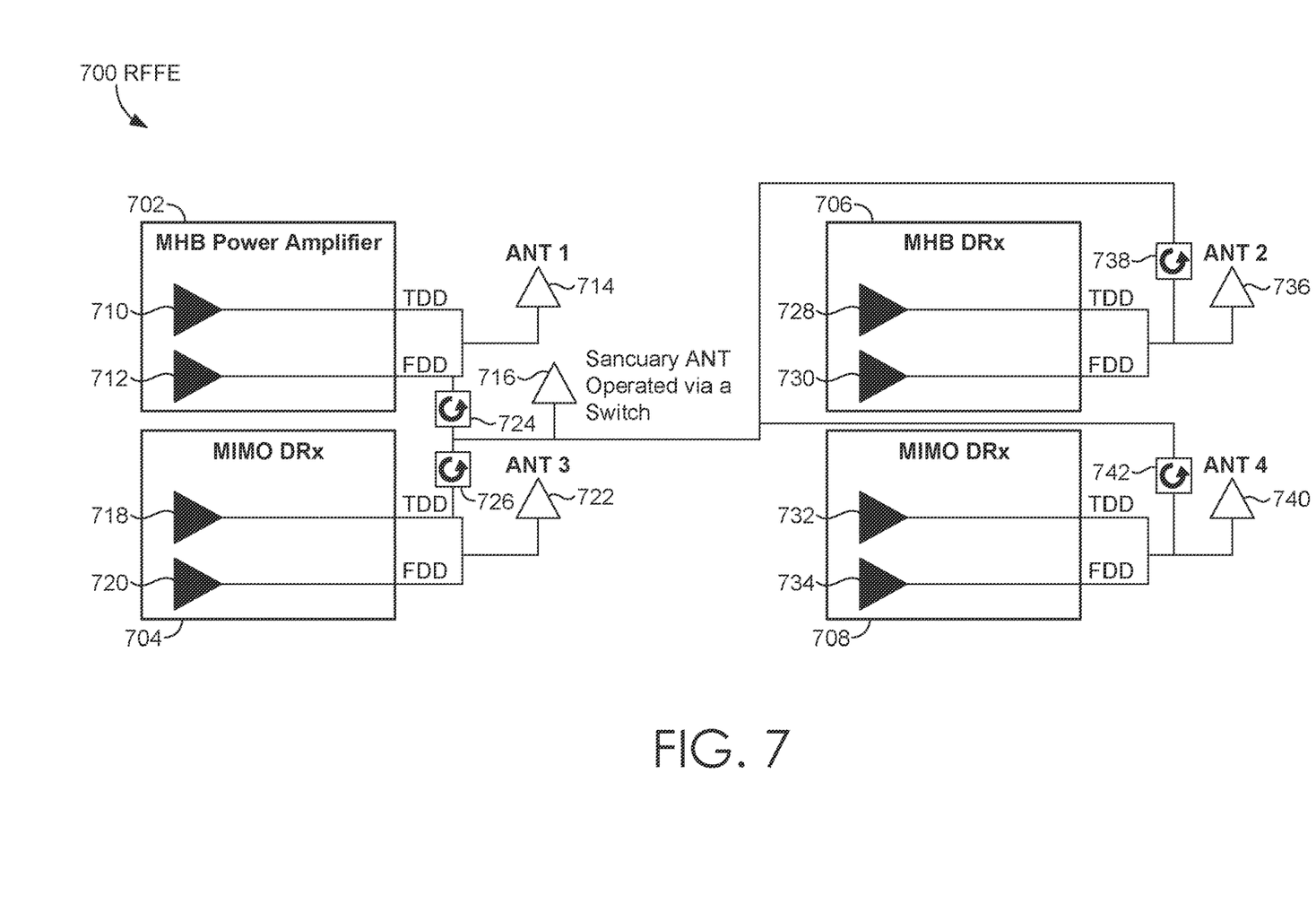
FIG. 7 is a block diagram of an apparatus for providing a sanctuary antenna for FDD carrier mitigation during TDD SRS antenna sharing, in accordance with aspects herein.

FIG. 7 is a block diagram of an apparatus for providing a sanctuary antenna for FDD carrier mitigation during TDD SRS antenna sharing, in accordance with aspects herein. The radio frequency front end (RFFE) 700 includes medium high band (MHB) power amplifier block 702, MIMO discontinuous reception (DRx) block 704, MHB DRx block 706, and MIMO DRx block 708. DRx is used in mobile devices to conserve the battery of the mobile device. The UE and the network negotiate phases in which data transfer occurs. At other times, the UE turns off its receiver and enters a low power state. The MHB power amplifier block 702 further includes a first amplifier 710 that outputs a TDD data stream that is sent to a first antenna 714. First antenna 714 may be the primary antenna for the UE. TDD is a method for establishing a full-duplex communication link. The timing of the primary antenna, first antenna 714, is critical because of potential collisions between transmit and receive in SRS operations. The problem arises because two band and two time domains are interacting, and carrier aggregation further complicates slot timing. Uplink communications are separated from downlink communications by the allocation of different time slots in the same frequency band. TDD allows asymmetric flow for uplink and downlink data transmission.

A second amplifier 712 in MHB power amplifier block 702 outputs a FDD data stream that is sent to the first antenna 714. FDD is a method for establishing a full duplex communications link. FDD uses two different radio frequencies, one for transmitter operation and the other for receiver operation. In operation, the transmitter and receiver as assigned to different communication channels. To avoid FDD receive interruption during SRS reception on antennas 714, 722, 736, and 742 a Sanctuary antenna 716 of the TDD band is switched by first switch 724 before the start of the slot for which the TDD band will be transmitting the SRS symbol. When this occurs, the sanctuary antenna 716 replaces the interrupted first antenna 714 for the FDD receive data stream.

The sanctuary antenna improves block error rates (BLER) on slots affected by FDD interruption. This improvement may be as much as 80% and eliminates throughput degradation on the FDD band. In operation, the sanctuary antenna 716 may be switched in by first switch 724 so that the FDD output from second amplifier 712 is sent to sanctuary antenna 716. The RFFE 700 includes first MIMO DRx block 704 that also includes a first MIMO amplifier 718 outputs a TDD data stream that is input to a second switch 726. A second MIMO amplifier 720 outputs an FDD data stream that may be sent to a third antenna 722.

The RFFE 700 also includes a second MHB DRx block 706. The second MHB DRx block 706 includes a TDD amplifier 278 and a FDD amplifier 730, both of which are in communication with third switch 738 and second antenna 736. The RFFE 700 also includes a second MIMO DRx block 708 that includes TDD amplifier 732 and FDD amplifier 734. The outputs from the TDD amplifier 732 and the FDD amplifier 734 are in communication with fourth switch 742 and fourth antenna 740.

The first, second, third, and fourth switches 724, 726, 738, and 742 are used to switch FDD signals that appear on specific slots during FDD reception. Each switch may be optimized for a particular frequency band and each antenna may also be designed for a particular band. In the RFFE 700 four antennas 714, 722, 736, and 742 may each be sued on a different band and the four switches 724, 726, 738, and 742 may also be optimized to operate with the antennas they are associated with. The antenna sharing described in FIG. 7 creates spatial diversity by coordinating transmissions and processing of distributed radios. The sanctuary antenna 716 frees up an antenna for SRS operations.

Figure 8:
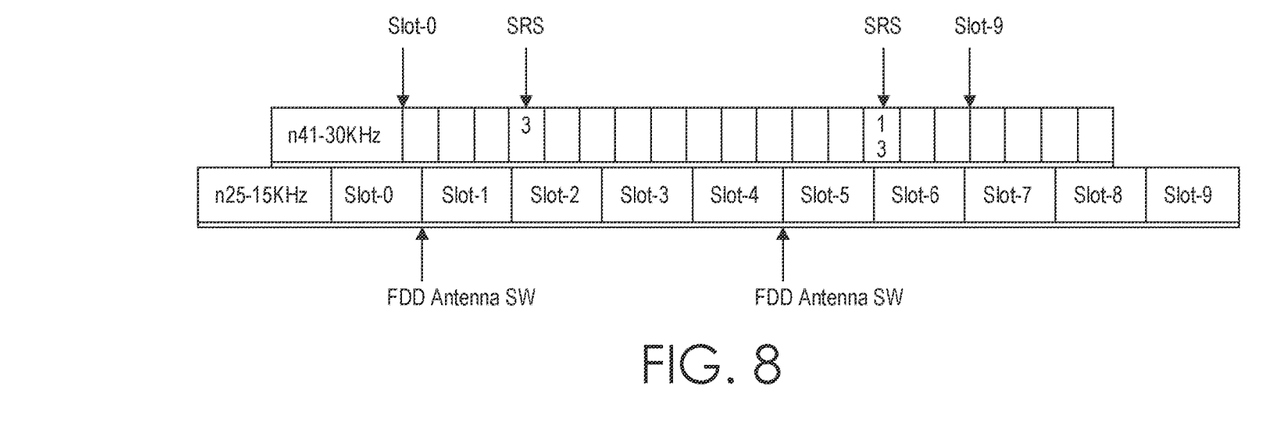
FIG. 8 depicts slot allocation using a sanctuary antenna for FDD carrier mitigation during TDD SRS antenna sharing, in accordance with aspects herein.

FIG. 8 depicts slot allocation using a sanctuary antenna for FDD carrier mitigation during TDD SRS antenna sharing, in accordance with aspects herein. The slot diagram depicts two frequency bands, N41, a 30 KHz band and N25 a 15 KHz band. SRS transmissions occurs at designated intervals on specific slots, here slots 3 and 13. To avoid interruption during SRS receive operations on antennas 714, 722, 736, and 742 of FIG. 7, the sanctuary antenna 716 may be introduced for the FDD band. The introduction of the sanctuary antenna 716 occurs before slot 1 for the N25 frequency band and against before slot 5, both instances of which are denoted FDD Antenna switch in FIG. 8. The sanctuary antenna 716 may be switched before the start of the slot for which the TDD band will be transmitting the SRS symbol and the sanctuary antenna 716 replaces the interrupted FDD antenna during SRS symbol transmission. The antenna switching may occur two slots before the TDD transmission and no switching occurs in the middle of a slot, as this would corrupt the TDD SRS and the start of the FDD slot. The antenna switching needs at least one full slot before the switch is to take effect. A modem in the power amplifier block 702 knows which antenna will be active at any given time for the UE. The modem performs the slot calculation and then directs the appropriate antenna switch operations to ensure that the sanctuary antenna is switched in at the appropriate slot. The sanctuary antenna 716 will replace the interrupted FDD receive antenna during SRS symbol reception.

Figure 9:
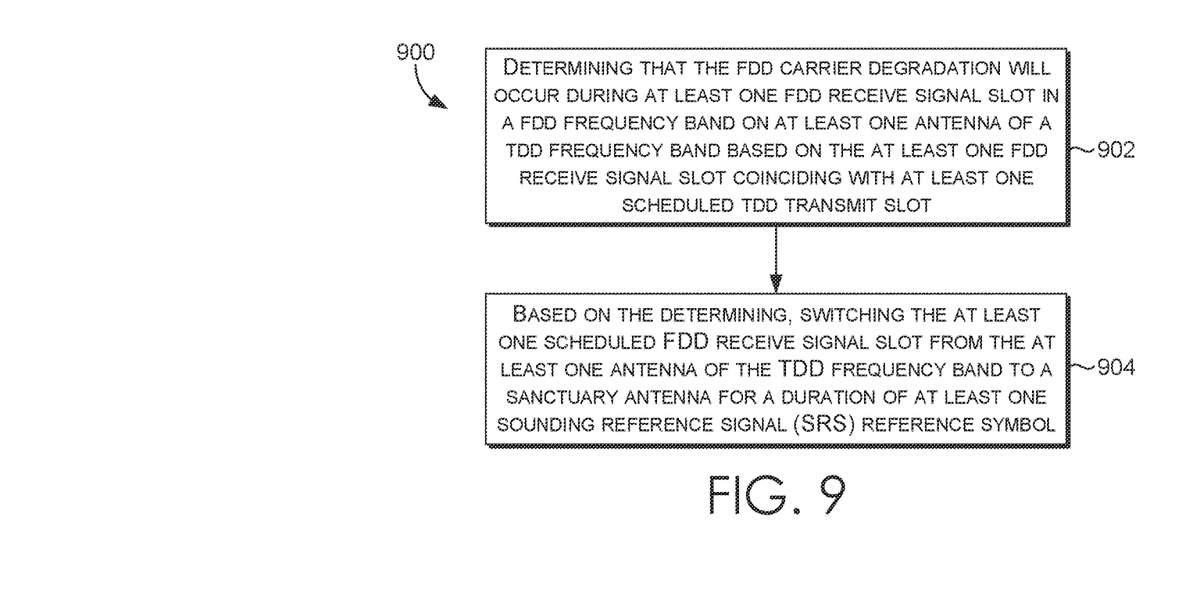
FIG. 9 is a flow diagram of a method for FDD carrier mitigation during TDD SRS antenna sharing, in accordance with aspects herein.

FIG. 9 is a flow diagram of a method for FDD carrier mitigation during TDD SRS antenna sharing, in accordance with aspects herein. The method 900 begins in step 902 with determining that the FDD carrier degradation will occur during at least one FDD receive signal slot in a FDD frequency band on at least one antenna of the TDD frequency band based on the at least one FDD receive signal slot coinciding with at least one scheduled TDD transmit slot. The method then continues in step 904 with based on the determining, switching the at least one scheduled FDD receive signal slot for the at least one antenna of the TDD frequency band to a sanctuary antenna for a duration of the at least one sounding reference signal (SRS) reference symbol.

Switching the at least one scheduled FDD receive signal slot to the sanctuary antenna may occur at least two slots before the at least one FDD receive signal slot is scheduled to be transmitted. The switching may also occur before a start of a slot for which the TDD frequency band will transmit the SRS symbol. The sanctuary antenna replaces at least one of the TDD frequency band antennas during SRS symbol reception. The switching to the sanctuary antenna may occur after slot 0 and before slot 1 in a FDD frequency band. The switching may also occur after slot four and before slot 5. The FDD frequency band may be a 15 KHz band and the TDD frequency band may be a 30 KHz band.

FIG. 10 depicts an exemplary computing device suitable for use in implementations of the present disclosure, in accordance with aspects herein. With continued reference to FIG. 10, computing device 1000 includes bus 1010 that directly or indirectly couples the following devices: memory 1012, one or more processors 1014, one or more presentation components 1016, input/output (I/O) ports 1018, I/O components 1020, radio(s) 1024, and power supply 1022. Bus 1010 represents what may be one or more busses (such as an address bus, data bus, or combination thereof). Although the devices of FIG. 10 are shown with lines for the sake of clarity, in reality, delineating various components is not so clear, and metaphorically, the lines would more accurately be grey and fuzzy. For example, one may consider a presentation component such as a display device to be one of I/O components 1020. Also, processors, such as one or more processors 1014, have memory. The present disclosure hereof recognizes that such is the nature of the art, and reiterates that FIG. 10 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 10 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. Memory 1012 may be removable, nonremovable, or a combination thereof. Exemplary memory includes solid-state memory, hard drives, optical-disc drives, etc. Computing device 1000 includes one or more processors 1006 that read data from various entities such as bus 1010, memory 1012 or I/O components 1020. One or more presentation components 1016 present data indications to a person or other device. Exemplary one or more presentation components 1016 include a display device, speaker, printing component, vibrating component, etc. I/O ports 1018 allow computing device 1000 to be logically coupled to other devices including I/O components 1020, some of which may be built into computing device 1000. Illustrative I/O components 1020 include a microphone, joystick, game pad, satellite dish, scanner, printer, wireless device, etc.

The radio(s) 1024 represents one or more radios that facilitate communication with a wireless telecommunications network. While a single radio 1024 is shown in FIG. 10, it is contemplated that there may be more than one radio 1024 coupled to the bus 1010. Illustrative wireless telecommunications technologies include CDMA, GPRS, TDMA, GSM, and the like. The radio 1024 may additionally or alternatively facilitate other types of wireless communications including Wi-Fi, WiMAX, LTE, 3G, 4G, LTE, 5G, NR, VOLTE, or other VOIP communications. As can be appreciated, in various embodiments, radio 1024 can be configured to support multiple technologies and/or multiple radios can be utilized to support multiple technologies. A wireless telecommunications network might include an array of devices, which are not shown so as to not obscure more relevant aspects of the invention. Components such as a access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for mitigating frequency division duplexing (FDD) carrier degradation during time division duplexing (TDD) antenna sharing in a network, the method comprising:
   determining that the FDD carrier degradation will occur during at least one FDD receive signal slot in a FDD frequency band on at least one antenna of a TDD frequency band based on the at least one FDD receive signal slot coinciding with at least one scheduled TDD transmit signal slot; and
   based on the determining, switching at least one scheduled FDD receive signal slot from the at least one antenna of the TDD frequency band to a sanctuary antenna for a duration of at least one sounding reference signal (SRS) reference symbol.

2. The method of claim 1, wherein switching the at least one scheduled FDD receive signal slot to the sanctuary antenna occurs at least two slots before the at least one FDD receive signal slot is scheduled to be transmitted.

3. The method of claim 1, wherein switching the at least one scheduled FDD receive signal slot occurs before a start of a slot for which the TDD frequency band will transmit a SRS symbol.

4. The method of claim 1, wherein the sanctuary antenna replaces the at least one antenna of the TDD frequency band during SRS symbol reception.

5. The method of claim 1, wherein switching to the sanctuary antenna occurs before a start of a slot where a SRS symbol will be transmitted in the TDD frequency band.

6. The method of claim 1, wherein switching to the sanctuary antenna occurs after slot 0 and before slot 1 in the FDD frequency band.

7. The method of claim 1, wherein switching to the sanctuary antenna occurs after slot 4 and before slot 5.

8. The method of claim 1, wherein the FDD frequency band is a 15 KHZ band.

9. The method of claim 1, wherein the TDD frequency band is a 30 KHz band.

10. A method for mitigating frequency division duplexing (FDD) carrier degradation during time division duplexing (TDD) antenna sharing in a network, the method comprising:
    receiving at least one uplink message from a user equipment (UE) at an access point, the at least one uplink message containing slot assignments for at least one FDD receive frequency band and at least one TDD transmission band, based on slot assignments for at least one slot of the at least one FDD receive frequency band and the at least one TDD transmission band coinciding for at least a portion of a slot comprising a sounding reference signal (SRS) symbol; and
    based on the at least one uplink message, directing the UE to switch from receiving the SRS symbol on at least one antenna of the at least one TDD transmission band to receiving the SRS symbol on a sanctuary antenna.

11. The method of claim 10, wherein the UE is directed to switch to the sanctuary antenna at least two slots before receiving the SRS symbol on the sanctuary antenna.

12. The method of claim 10, wherein directing the UE to switch to the sanctuary antenna occurs after a slot 0 and before a slot 1 in a FDD receive frequency band.

13. The method of claim 10, wherein the FDD receive frequency band is a 15 KHz band.

14. The method of claim 10, wherein a TDD transmission band is a 30 KHz band.

15. A non-transitory computer storage media storing computer-usable instructions that, when used by one or more processors, cause the one or more processors to:
    determine that carrier degradation will occur during at least one frequency division duplexing (FDD) receive signal slot in a FDD frequency band on at least one antenna of a time division duplexing (TDD) frequency band based on the at least one FDD receive signal slot coinciding with at least one scheduled TDD transmit signal slot; and
    based on the determination, switch at least one scheduled FDD receive signal slot from the at least one antenna of the TDD frequency band to a sanctuary antenna for a duration of at least one sounding reference signal (SRS) reference symbol.

16. The non-transitory computer storage media of claim 15, wherein switch the at least one scheduled FDD receive signal slot to the sanctuary antenna occurs at least two slots before the at least one FDD receive signal slot is scheduled to be transmitted.

17. The non-transitory computer storage media of claim 15, wherein switch the at least one scheduled FDD receive signal slot occurs before a start of a slot for which the TDD frequency band will transmit a SRS symbol.

18. The non-transitory computer storage media of claim 15, wherein the sanctuary antenna replaces the at least one antenna of the TDD frequency band during SRS symbol reception.

19. The non-transitory computer storage media of claim 15, wherein switch to the sanctuary antenna occurs before a start of a slot where a SRS symbol will be transmitted in the TDD frequency band.

20. The non-transitory computer storage media of claim 15, wherein the FDD frequency band is a 15 KHz band and the TDD frequency band is a 30 KHZ band.

* * * * *